Patented Oct. 5, 1926.

1,602,163

UNITED STATES PATENT OFFICE.

EUDO MONTI, OF TURIN, ITALY.

PROCESS OF DIGESTING AND CONCENTRATING PROTEIN AND PREPARING NON-ALCOHOLIC DRUG EXTRACTS.

No Drawing.   Application filed May 27, 1921. Serial No. 473,085.

My invention relates to processes of digesting and concentrating protein in any form and also preparing several non-alcoholic drug extracts by dissolving materials in grape and other sugary and acid fruit or berry juices such as orange, lemon, raspberry, currant, loganberry, and others.

The object of the pesent invention is to substantially improve and extend the proceedings described and claimed in my U. S. Patents 1,167,006 and 1,226,983 in which the matter above mentioned is first disclosed and claimed.

Researches by Profs. Bertarelli, Finzi, Mensio, Todeschini, and especially by Dr. E. Garino Canina of the Royal Enological Experiment Station of Asti, Italy, also personal researches I have made concerning the ripening of fruits and berries under the action of special enzymes working at a low temperature and in the presence of organic acids furnishing a suitable medium as disclosed and claimed in my U. S. Patent application No. 465,029, filed April 27th, 1921, have shown that the process of digestion of protein in grape juice and in other fruit and berry juices such as orange and lemon and the like proceeds much further than I had supposed or mentioned in the Patents 1,167,006 and 1,226,983. Said digestion in fact proceeding so far as to produce a considerable percentage of amino acids, such as lysine, tyrosine, tryptophane, crystine, alinine and others; such substances in fact as are the normal end products of protein digestion and which are readily absorbed into the blood stream as in fact are the grape and fruit sugar and the natural salts and acids of such fruit juices.

The researches above mentioned, especially those of Dr. E. Garino Canina (ref. Rivista di Ampelografia #V, March 1st, 1920) show that the percentage of amino acids is larger when the quantity of protein used is small compared to the quantity of juice taken for the digestion also that the protein digestion proceeds more nearly to completion when the juice used has been previously concentrated by the freezing process. The experiments also show that orange or lemon juice is even more active than grape juice in the digestion of protein though the final product is not so pleasing to the taste as when grape juice is used alone or mixed with the orange juice. It should be mentioned that the juice of such grapes as muscatel, white malvasia, Tokay, and Riesling blend very well with orange juice or even with tomato juice, and the digestion products obtained with such blends are not only cheap but have a very agreeable taste, and are of high dietetic value and especially when eggs or milk is used with the juices the products are exceptionally rich in vitamines of all types.

The knowledge and the experience gained by such experiments, in the preparation of the products described and claimed in my U. S. Patent 1,226,983 have pointed the way to substantial improvements in the processes, aiming at greater efficiency in the digestions and also at considerable savings cost of production and transportation charges.

Studies have also been made concerning the efficiency and potency of drug extracts made by using grape and other fruit juices. Dr. Ceruti of Turin, Dr. Lerjnberger and Stenico of the Vienna University in several clinical experiments found that grape and orange juices concentrated by freezing would dissolve the active principles contained in purgative rosins while they do not dissolve the rosin itself and therefore the laxatives thus prepared have the purgative effect of the drug administered in its ordinary state as when dissolved in alcohol but not the irritating actions that the rosins have on the intestines so that the effect of the laxative is obtained without discomfort or pain. Also the active principles contained in most of the drugs, the alcoholic extracts of which are used to make vermouth fernets, bitters, elixirs, and aperients in general, such as absinthe, calamus, cardimun, mint, cardus benedictus, corianden, coca cola, coffee, tea and the like can be more conveniently extracted using grape or other fruit syrups than by using alcohol.

Enzyme preparations such as pepsin, trypsin, steapsin and other organic preparations such as peptonate of iron and citrated iron can be very conveniently made using grape juice or orange juice concentrated at a low temperature so that it is unnecessary to use alcohol in the preparation of such products as has been above mentioned.

I have further shown that if desirable such products as have been described can easily be made into a jelly according to the scheme outlined in my Patent No. 1,398,339. In such form the products are sometimes much easier to handle. Again in such a homogeneous mixture of a jelly consistency drug preparations of very bad taste can be easily divided into equal portions each containing a proper amount of active principle and subsequently coated with sugar or in any suitable manner put in tabloid form. The low temperature preparation of jelly as above mentioned, makes possible the manufacture of such drug products as mentioned in my U. S. Patent 1,167,006 and many others, into a jelly without decomposition or alteration. Further with such drug preparations as have a bad taste or with such digestion mixtures as are not of very pleasing taste or appearance for instance when blood is digested such products after jellying could be dried by any of the low temperature drying processes, such for instance as a current of previously dried air warmed to 37° centigrade, and afterwards powdered and made into tablets or pills by well known processes or put in capsules. On drying if the mass is too sticky to powder nicely it can be mixed with some inert powder such as starch after which it can be made into tablet or pill or put in capsule.

The improved proceedings include the following steps:

1. First manufacture the ampeloplastin, ampelogalactin and ampeloematine (respectively, meat extract, milk and blood digested in grape juice) and the like containing a considerable percentage of protein (corresponding to from 2 to 5 per cent of nitrogen) operating in the manner described in my above mentioned Patent 1,226,983. As distinguished from the process disclosed in this patent, however, in order to hasten the digestion of the protein, a fruit or berry juice of higher acidity is added to the grape juice, and I obtain thus a concentrated product very rich in partially digested proteins which being in a keeping condition can be used as a very concentrated digested and practically unalterable food, stored and eventually transported under reduced weight and volume to be used as a raw material for the preparation of the products hereinafter described.

2. I dissolve the products of #1 in natural, slightly concentrated grape, orange or other fruit juice, containing enough organic acidity to insure that the product will keep, in such proportion as to obtain a final product averaging about 1% of nitrogen in proteic form or less than 6% of protein. I keep the mixture at a temperature not exceeding 40° C. for a period of 2 to 3 days stirring frequently, afterwards concentrating it in a luke warm water heated vacuum pan at a temperature not exceeding 40° C. until the moisture content of the product is reduced to less than 30%. The product thus obtained will keep and contains a very high percentage of the protein matter completely digested, and if prepared with beef extract, egg or milk has a very agreeable taste and may be used as a food or dietetic product.

3. In order to improve the glue like consistency of the above obtained product so that it can more easily be used, I mix with it enough pectin solution to make it into a thick jelly which can be easily kept. It is very necessary that during the jelly making process the product be not warmed over 40° C. I obtain said aim by using the proceeding described and claimed in the above mentioned Patent No. 1,398,339 and the apparatus in my U. S. patent application 285,907.

4. A further step is the addition to the products of such enzymes as pepsin, trypsin and the like or such organic material as peptone, peptonate of iron, citrated iron, guaiacol, purgative rosins, aperients and other drugs which the physician may deem necessary to make the product useful not only to healthy people but also to sick people needing treatment and to whom the administration of alcoholic extracts may seem inadvisable.

5. Should the products obtained have a bad taste the jellies could be divided into proper portions and coated with glue or sugar into tabloid form by any suitable method provided a temperature of 40° centigrade is not exceeded.

6. A further step is the elimination of the water contained in the concentrated jelly in order to turn it into a powder so that it can more easily be put in tablet or pill form or put into capsules. Should the added drug make the final product sticky the addition of some indifferent matter such as starch may be resorted to in order to put the material in form for tablet or pill. The addition of pectin is usually sufficient to cause the material to be easily powdered.

I claim:

1. The process of digesting protein, which consists in dissolving and hydrolizing the protein of eggs, milk, blood and the like in grape juice to which another fruit or berry juice of higher acidity has been added.

2. The process set forth in claim 1, comprising the preliminary step which consists in concentrating the blended grape and other fruit or berry juices by the freezing method.

3. The process of digesting protein which consists in mixing a small quantity of protein with a concentrated extract consisting of a mixture of grape juice and another fruit or berry juice of higher acidity, storing the mixture for two or three days at a temperature and then concentrating it at a temperature not exceeding 40° cent. not more than 40° cent. until the product contains less than one-third by weight of moisture.

4. In the process set forth in claim 3, the further step which consists in adding to the mixture enzymes such as pepsin, trypsin or the like, or organic substances such as peptone, petonate of iron, citrated iron, guaiacol, purgative rosins, aperients or other drugs.

5. The product consisting of the digested protein of eggs, milk, blood and the like in concentrated extract of grape juice and another fruit or berry juice of higher acidity.

6. The product consisting of substantially 6% digested protein in concentrated extract of grape juice and another fruit or berry juice of higher acidity.

7. The product consisting of the digested protein of eggs, milk, blood and the like, in concentrated extract of grape juice and another fruit or berry juice of higher acidity, and added enzymes or organic substances of medicinal value.

8. The process consisting in digesting proteins in the juice of grapes or the like, dissolving the resultant in a fruit juice of relatively high acidity, and eventually concentrating at a temperature not exceeding 40° C.

EUDO MONTI.